United States Patent
Ansart et al.

[11] Patent Number: 5,934,067
[45] Date of Patent: Aug. 10, 1999

[54] GAS TURBINE ENGINE COMBUSTION CHAMBER FOR OPTIMIZING THE MIXTURE OF BURNED GASES

[75] Inventors: Denis Roger Henri Ansart, Bois le Ros; Patrick Samuel André Ciccia, Paris, both of France

[73] Assignee: Societe National d'Etude et de Construction de Moteurs d'Aviation (SNECMA), Paris, France

[21] Appl. No.: 08/845,133

[22] Filed: Apr. 21, 1997

[30] Foreign Application Priority Data

Apr. 24, 1996 [FR] France .................................. 96 05138

[51] Int. Cl.⁶ ........................................................ F23R 3/06
[52] U.S. Cl. .............................................. 60/39.36; 60/748
[58] Field of Search ..................... 60/39.36, 748, 60/752, 756

[56] References Cited

U.S. PATENT DOCUMENTS 2,517,015  8/1950  Mock et al. .
2,807,139  9/1957  Jackson .

FOREIGN PATENT DOCUMENTS

| 676590 | 10/1995 | European Pat. Off. . |
| 623977 | 5/1949 | United Kingdom . |
| 1112357 | 5/1968 | United Kingdom . |
| 1462903 | 1/1977 | United Kingdom . |
| 2020371 | 11/1979 | United Kingdom . |

*Primary Examiner*—Louis J. Casaregola
*Attorney, Agent, or Firm*—Bacon & Thomas, PLLC

[57] ABSTRACT

A gas turbine engine combustion chamber bounded by inner and outer annular walls extending around a longitudinal axis of the engine and connected by an end wall, through which extend a plurality of fuel injectors, each with an intake air swirler. The outer annular wall has a plurality of first orifices arranged in a common plane and spaced apart in a circumferential direction such that each first orifice is circumferentially associated with a fuel injector and is located on one side of a radius line extending from the longitudinal axis and passing through the axis of the associated fuel injector, and a plurality of second orifices in the inner annular wall arranged in a common plane and spaced apart in a circumferential direction such that each second orifice is circumferentially associated with a fuel injector and is located on an opposite side of the radius line from the first orifice associated with the same fuel injector.

10 Claims, 3 Drawing Sheets

GAS TURBINE ENGINE COMBUSTION CHAMBER FOR OPTIMIZING THE MIXTURE OF BURNED GASES

BACKGROUND OF THE INVENTION

The present invention relates to a gas turbine engine combustion chamber having strategically placed dilution orifices to optimize the mixture of gases burned in the combustion chamber.

Annular combustion chambers for gas turbine engines are well known in the art and typically comprise inner and outer walls joined at one end by an end wall to bound the combustion chamber, which has an outlet opening at an end opposite the end wall. A plurality of fuel injectors are arrayed through the end wall, each fuel injector having an air injection swirler to induce vortices in the fuel/air mixture around the injector axis. Typically, the interior of the combustion chamber is divided into a combustion zone extending in a downstream direction from the end wall which blends into a dilution zone in which dilution air is introduced through orifices in the inner and/or outer walls to dilute the combustion gases and the reduce their temperatures so that they are compatible with the turbine located downstream of the combustion chamber outlet.

The combustion chamber walls of an aeronautical gas turbine engine have many air intake orifices to facilitate the burning of the fuel injected into the combustion chamber. The orifices may be divided into air intake orifices which supply the major portion of the air to support the combustion in the combustion zone of the chamber, and dilution orifices located further downstream from the end wall in the dilution zone to supply air to the burned gases so as reduce the temperature of the burned gases so as to be compatible with the thermal strength of the turbine.

The combustion of the fuel/air mixture takes place in the combustion zone of the chamber in which primary oxidizer is supplied through the injection swirlers and through various air inlet orifices in the end wall of the combustion chamber.

The dilution orifices are located in rows of planes transverse to the axis of the combustion chamber and, typically, the orifices in the outer annular wall are circumferentially aligned with orifices in the inner annular wall. A first row of such orifices, often called the "primary orifices" is located at the juncture of the combustion zone and the pollution zone. Part of the air introduced through these "primary orifices" circulates toward the combustion zone and takes part in the combustion of the fuel/air mixture, while another portion of the air enters the dilution zone and contributes to the dilution of the burned gases. The first row of orifices may be followed in a downstream direction by one or more rows of dilution orifices which introduce air into the dilution zone.

The mutually opposite location of the primary orifices and dilution orifices in the inner and outer walls produces an obstacle to the burned gases coming from the combustion zone which adversely affects the homogenzing of the temperatures of the burned gases fed to the turbine. This deleteriously affects the efficient operation of the turbine.

SUMMARY OF THE INVENTION

An objective of the present invention is to eliminate the deficiencies of the known prior art combustion chambers and to improve the homogenization of the temperatures of the burned gases emanating from the combustion chamber.

This goal is achieved by a gas turbine engine combustion chamber bounded by inner and outer annular walls extending around a longitudinal axis of the engine and connected by an end wall, through which extend a plurality of fuel injectors, each with an intake air swirler. The outer annular wall has a plurality of first orifices arranged in a common plane and spaced apart in a circumferential direction such that each first orifice is circumferentially associated with a fuel injector and is located on one side of a radius line extending from the longitudinal axis and passing through the axis of the associated fuel injector, and a plurality of second orifices in the inner annular wall arranged in a common plane and spaced apart in a circumferential direction such that each second orifice is circumferentially associated with a fuel injector and is located on an opposite side of the radius line from the first orifice associated with the same fuel injector.

By circumferentially displacing the first and second orifices on opposite sides. of a radial line passing through the associated fuel injector, the air passing through the first and second orifices may assist in the swirling of the fuel/air mixture, or may oppose the swirling direction of the fuel air mixture in order to moderate, maintain, or amplify the swirling of the burned gases emanating from the combustion zone.

The invention also entails the use of third orifices in the outer annular wall and fourth orifices on the inner annular wall having diameters smaller than the corresponding first and second orifices and which are circumferentially and axially displaced from the respective first and second orifices.

BRIEF DESCRIPTION OF THE INVENTION

DETAILED DESCRIPTION OF THE PREFERRED EMBODIMENTS

Figure 1:
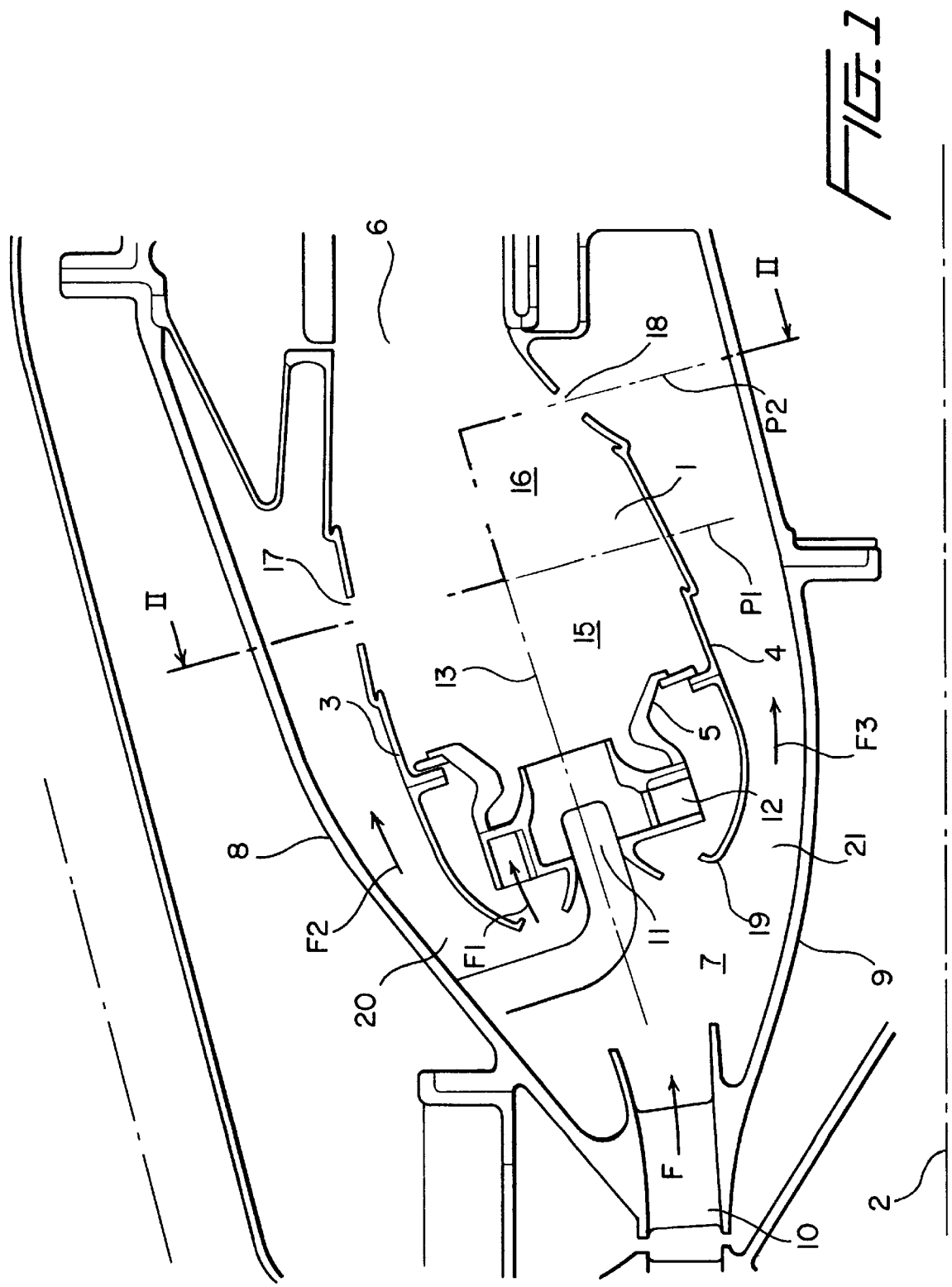
FIG. 1 is a partial, longitudinal cross-sectional view of the combustion chamber according to the present invention.

The figures illustrate an annular combustion chamber 1 of a gas turbine engine that is generally annular in configuration and extends about longitudinal axis 2 of the gas turbine engine. The combustion chamber 1 is bounded by an outer wall 3 and an inner wall 4 which are joined at their upstream ends by end wall 5. The combustion chamber 1 has an outlet passage 6 through which the burned exhaust gases pass and are directed through a turbine (not shown). The combustion chamber 1 is located in a chamber 7 bounded by an outer casing 8 and an inner casing 9 joined at their upstream ends by diffuser 10. In known fashion, the diffuser 10 directs air from a compressor (not shown) into the chamber 7.

The end wall 5 is fitted with an injection system comprising a plurality of fuel injectors 11 arranged in annular array about the longitudinal axis 2, each fuel injector 11 being associated with at least one air injecting swirler 12. Such swirlers are wellknown in the art and need not be further described in detail. The swirlers impart a swirling motion to the fuel/air mixture in the combustion chamber, as denoted by arrows 14 in FIG. 2. As illustrated, the air swirling about each of the fuel injectors 11 swirls in a common direction.

A primary or combustion zone 15 is located in the upstream portion of the combustion chamber 1 adjacent to end wall 5 and is the location in which the fuel/air mixture is burned. The combustion chamber further comprises a dilution zone 16, located downstream of the combustion zone 15 in which dilution air is introduced through the orifices 17 and 18 respectively formed in the outer and inner walls 3 and 4. Additional orifices, in known fashion, allow the introduction of air through the inner and outer walls 3 and 4 to take part in the combustion in the primary zone, or to form a protective film between the hot gas in the combustion chamber and the inner surfaces of the walls 3 and 4.

Air flow F issuing from the diffuser 10 is split into a plurality of flow streams by dome 19 capping the chamber end wall 5. A first air flow F1 enters the dome 19 to pass through the swirlers 12 and to participate in the atomization and combustion of the fuel emanating from the fuel injection nozzle. A second air flow F2 passes into the annular space 20 bounded between the outer wall 3 and the outer casing 8, while a third air flow F3 circulates in the inner annular space 21 bounded by the inner wall 4 and the inner casing 9. Flows F2 and F3 take part in the cooling of the walls 3 and 4, as well as forming the protective film on their inner surfaces. The major portion of flows F2 and F3 enters the dilution zone 16 through the orifices 17 and 18.

The orifices 17 and 18 are distributed in rows of orifices in planes extending generally transverse to the axis 13 of the combustion chamber, illustrated by planes P1 and P2. The transverse plane P1 is situated at the boundary between the combustion zone 15 and the dilution zone 16. Part of the air entering through the orifices 17 and 18 in plane P1 circulates toward the combustion chamber end wall 5 to actively participate in the fuel combustion process in the combustion zone 15. The remaining part of the air entering through these orifices 17 and 18 in plane P1 mixes with the burned gases in the dilution zone 16.

Figure 2:
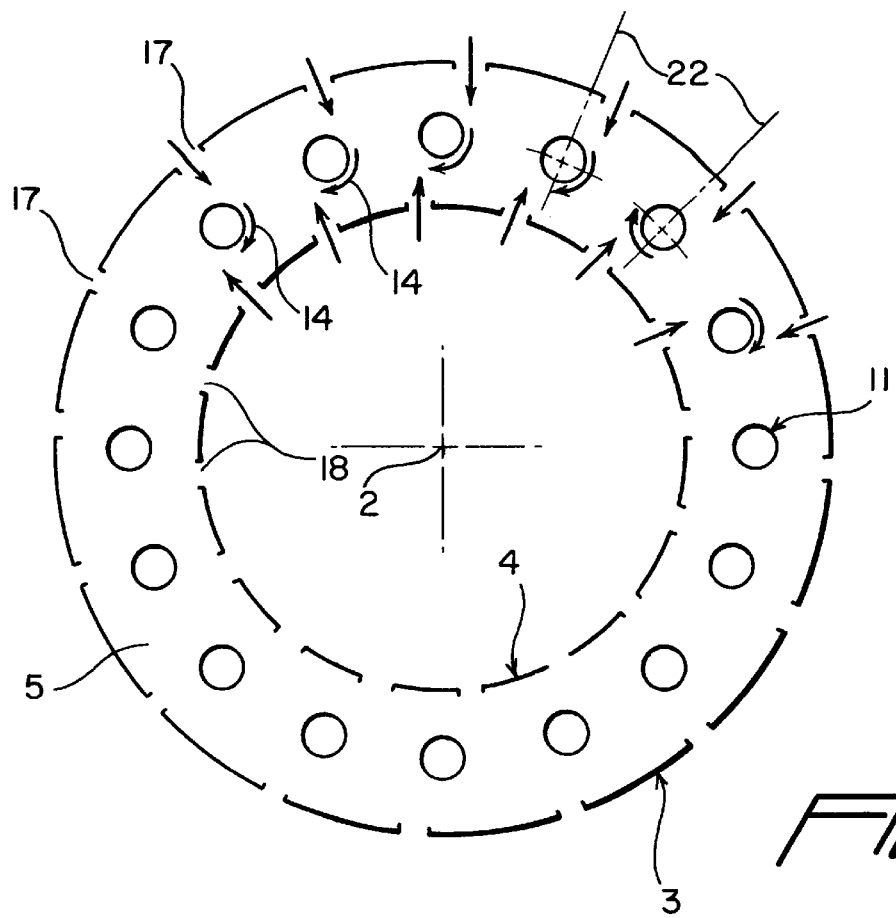
FIG. 2 is a cross-sectional view taken along line II—II in FIG. 1.

As best illustrated in FIG. 2, the orifices 17 formed in the outer wall 3 are offset toward one side of an associated fuel injector 11 with respect to a radial line 22 from the longitudinal axis 2 passing through the axis 13 of the associated fuel injector 11. The orifices 18 formed in the inner wall 4 are offset toward an opposite side of the associated fuel injector 11 with respect to the radial line 22 so as to be out of alignment with the corponding orifices 17. As illustrated, the air passing through the orifices 17 and 18 may merge to flow in the same direction as the swirling flow 14 to thereby enhance the swirling effect. The invention also encompasses the configuration in which the orifices 17 and 18 are positioned on opposite sides of the radial line 22, such that the air passing through the orifices flows counter to the swirling direction 14 imposed by the swirlers 12.

In the embodiment illustrated in FIG. 2, the number of orifices 17 and 18 are each equal to the number of fuel injectors 11 and the swirls all rotate in the same direction, clockwise when viewed from the downstream outlet 6 toward the end wall 5.

Figure 3:
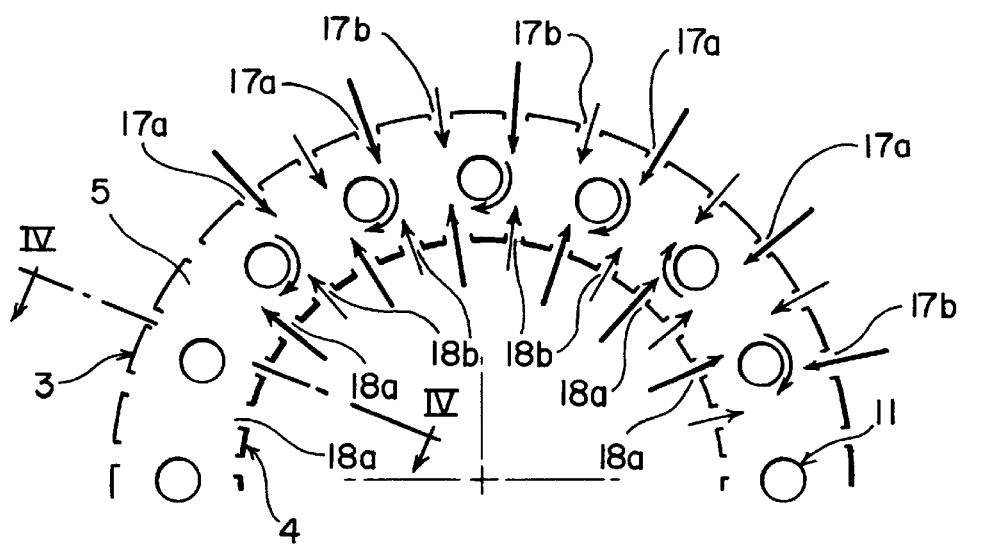
FIG. 3 is a partial, cross-sectional view similar to FIG. 2, illustrating a second embodiment of the combustion chamber according to the present invention.

An alternative embodiment is illustrated in FIG. 3 in which the number of orifices 17 and 18 in each row is twice the number of injectors 11. The outer wall 3 forms first orifices 17a, identical in structure and function as first orifices 17 described in the initial embodiment, as well as third orifices 17b. Similarly, inner wall 4 forms second orifices 18a, again identical in function and structure to second orifices 18 previously described, as well as fourth orifices 18b. As illustrated third, orifices 17b are aligned with second orifices 18a, while fourth orifices 18b are aligned with first orifices 17a in a radial direction. The diameters of third orifices 17b are less than those of first orifices 17a, as are the diameters of fourth orifices 18b smaller than the diameters of second orifices 18a. The larger diameter first and second orifices 17a and 18a supply an air flow identical to the air flow in the previously described embodiment. The third and fourth orifices 17b and 18b supply a lesser air flow in an opposite direction. This configuration allows the air flow through the first and second orifices 17a and 18a to maintain the swirling direction of the air emanating from the injection system. This configuration, as well as the previously described configuration, may be applied to the primary orifices located in plane P1 and to the dilution orifices located in plane P2.

Figure 4A:
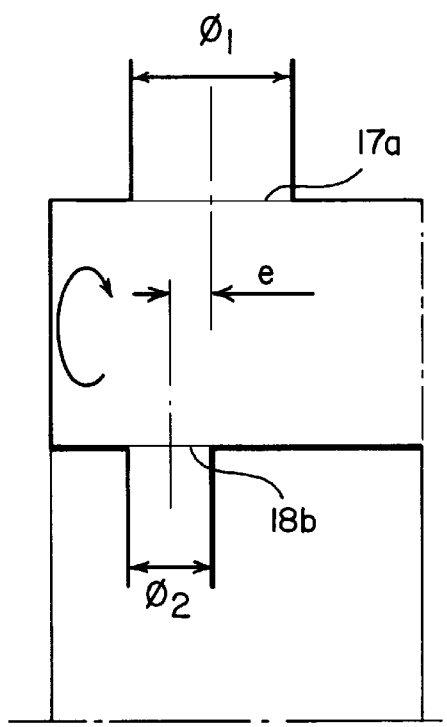
FIGS. 4a and 4b are cross-sectional views of alternative embodiments taken along line IV—IV in FIG. 3.
Figure 4B:
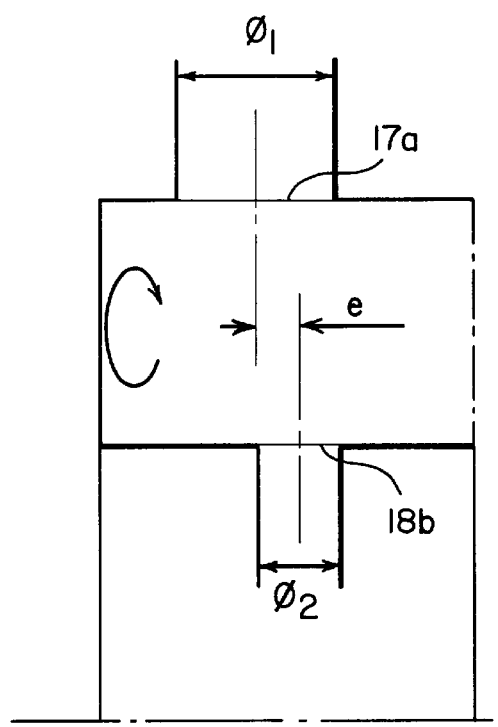

FIGS. 4a and 4b illustrate a variation of the embodiment in FIG. 3 in which the centers of the smaller diameter orifices are axially offset from the centers of the corresponding larger diameter fourth orifices. As illustrated, the smaller diameter orifice 18b is axially offset from the larger diameter first orifice 17a by an amount e, in either an upstream direction (towards the forward portion of the combustion chamber) illustrated in FIG. 4a, or in a downstream direction (towards the rear portion of the combustion chamber) as illustrated in FIG. 4b. The magnitude of the offset e is preferably between one-half the diameter of the larger diameter orifice and one-half the diameter of the smaller diameter orifice, i.e. $\phi_2/2 < e < \phi_1/2$.

The foregoing description is provided for illustrative purposes only and should note be construed as in any way limited this invention, the scope of which is defined solely by the appended claims.

We claim:

1. A gas turbine engine combustion chamber bounded by inner and outer annular walls extending around a longitudinal axis of the gas turbine engine and an end wall connecting the inner and outer annular walls and having a plurality of fuel injectors, each with an intake air swirler, extending through the end wall such that a fuel/air mixture flows in a predetermined generally circular swirling direction from the fuel injectors into the combustion chamber, the combustion chamber comprising:

a plurality of first orifices in the outer annular wall arranged in a first common plane and spaced apart in a circumferential direction such that each first orifice is circumferentially associated with a fuel injector and is offset toward one side of the associated fuel injector with respect to a radius line extending from the longitudinal axis and passing through the associated fuel injector; and a plurality of second orifice in the inner annular wall arranged in the second common plane and spaced apart in a circumferential direction such that each second orifice is circumferential associated with a fuel injector and is offset toward an opposite side of the associated fuel injector with respect to the radius line extending from the longitudinal access and passing through the associated fuel injector from the associated first orifices;

wherein the first and second planes are longitudinally offset with respect to each other.

2. A combustion chamber according to claim 1, wherein each of the first and second orifices are offset toward opposite sides of the associated fuel injector such that air entering the combustion chamber through the orifices merges with the flow of the fuel/air mixture in the predetermined swirling direction.

3. A combustion chamber according to claim 1, wherein each of the first and second orifices are offset toward opposite sides of the associated fuel injector such that air entering the combustion chamber through the orifices flows counter to the flow of the fuel/air mixture.

4. A combustion chamber according to claim 1, further comprising:

a plurality of third orifices in the outer annular wall, each third orifice being associated with one of the first orifices and being offset toward the opposite side of the radius line extending from the longitudinal axis and passing through the associated fuel injector.

5. A combustion chamber according to claim 4, further comprising:

a plurality of fourth orifices in the inner annular wall, each fourth orifice being associated with one of the second orifices and being offset toward the one side of the radius line extending from the longitudinal axis and passing through the associated fuel injector.

6. A combustion chamber according to claim 5, wherein diameters of the third and fourth orifices are less than diameters of the associated first and second orifices, respectively.

7. A combustion chamber according to claim 5, wherein centers of the third and fourth orifices are axially displaced from centers of the associated first and second orifices, respectively.

8. A combustion chamber according to claim 7, wherein diameters of the third and fourth orifices are less than diameters of the associated first and second orifices, respectively.

9. A combustion chamber according to claim 8, wherein the axial displacement between the centers of the first and fourth orifices is between one-half of the diameter of the first orifice and one half the diameter of the fourth orifice.

10. A combustion chamber according to claim 9, wherein the axial displacement between the centers of the second and third orifices is between one-half the diameter of the second orifice and one-half the diameter of the third orifice.

* * * * *